(12) United States Patent
Sakai et al.

(10) Patent No.: US 7,846,540 B2
(45) Date of Patent: Dec. 7, 2010

(54) IMPACT-ABSORBING COMPOSITE STRUCTURE

(75) Inventors: Shigeru Sakai, Bellevue, WA (US); Masayuki Kanemasu, Aichi (JP); Kenichiro Abe, Aichi (JP); Naoki Higuchi, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1375 days.

(21) Appl. No.: 10/562,723

(22) PCT Filed: Aug. 3, 2004

(86) PCT No.: PCT/JP2004/011091

§ 371 (c)(1),
(2), (4) Date: Dec. 30, 2005

(87) PCT Pub. No.: WO2006/013623

PCT Pub. Date: Feb. 9, 2006

(65) Prior Publication Data

US 2008/0152887 A1 Jun. 26, 2008

(51) Int. Cl.
*B32B 27/04* (2006.01)

(52) U.S. Cl. .................... 428/297.7; 442/135

(58) Field of Classification Search ............ 428/292.1, 428/297.4, 299.1, 299.4, 299.7, 911
See application file for complete search history.

(56) References Cited

U.S. PATENT DOCUMENTS 5,783,278 A * 7/1998 Nishimura et al. .......... 428/102

2002/0179390 A1* 12/2002 Kitano et al. ............... 188/371

FOREIGN PATENT DOCUMENTS

| EP | 1 413 415 A1 | 4/2004 |
|----|----|----|
| JP | 54-3879 | 1/1979 |
| JP | 60-109630 | 6/1985 |
| JP | 62-17438 | 1/1987 |
| JP | 05-332385 A | 12/1993 |
| JP | 06-123323 A | 5/1994 |
| JP | 6-300068 | 10/1994 |
| JP | 6-341477 | 12/1994 |
| JP | 7-217689 | 8/1995 |
| JP | 7-224875 | 8/1995 |
| JP | 10-235763 | 9/1998 |
| JP | 10-258471 A | 9/1998 |
| JP | 2003-39429 | 2/2003 |
| JP | 2003-073968 A | 3/2003 |
| JP | 2004-60058 | 2/2004 |

OTHER PUBLICATIONS

Japanese Office Action dated Mar. 17, 2008, issued in corresponding Japanese Patent Application No. 2003-122727.

* cited by examiner

*Primary Examiner*—Arti Singh-Pandey
(74) *Attorney, Agent, or Firm*—Westerman, Hattori, Daniels & Adrian, LLP

(57) ABSTRACT

An impact-absorbing composite structure is formed with a resin and a fiber laminated body, and absorbs, when experiencing an impact, the impact by self destruction. An interlayer-strength improvement technique is applied on the impact-absorbing composite structure in an oblique manner or in a gradual manner.

3 Claims, 10 Drawing Sheets

IMPACT-ABSORBING COMPOSITE STRUCTURE

TECHNICAL FIELD

The present invention relates to an impact-absorbing composite structure including a resin and a fiber laminated body that absorbs an impact by self destruction when an impact is applied, a method of manufacturing the impact-absorbing composite structure, and a driving object or an aviating object that employs the impact-absorbing composite structure.

BACKGROUND ART

An energy absorbing member that absorbs impact energy is used around a seat of an airplane, around a seat of a vehicle, around a bumper, and in each structural member (see, for example, Japanese Patent Application Laid-open Publication No. S60-109630 and Japanese Patent Application Laid-open Publication No. S62-17438). Since it necessitates that the energy absorbing member is light and has high rigidity apart from having a capability to absorb the impact energy, a composite material of a resin and a reinforced fiber, so called fiber reinforced plastic (FRP), especially carbon fiber reinforced plastic (CFRP) is suitable. In such energy absorbing member, an energy absorbing mechanism in which a local failure is caused to occur in a certain part of the energy absorbing member, such as an edge of the member as a starting point, and energy is absorbed by using this local failure, can be considered.

Moreover, regarding an impact resistance in a vehicle, mainly a frontal impact accident is apprehended, and as a measure against this, a member called as a front side member made of steel is disposed in a hood, and energy is absorbed by crushing of the member upon the frontal impact accident.

On the other hand, in a helicopter, an impact due to a forced landing is apprehended, and as a measure against it the impact resistant material is disposed under a floor. However, as compared to a length of the hood of the vehicle, in a structure under the floor of the helicopter, the height is limited for ensuring clearance under the floor. Furthermore, in recent years, since a need for a fuel tank under the floor becomes high for ensuring a cabin capacity, a restriction of an area and a stroke for disposing the impact resistant member is strict. Therefore, energy absorption efficiency higher than ever before is desired.

For this reason, so far, as an energy absorbing member, in a laminated composite material in which fibers are laminated, upon evaluating an effect due to a fiber material or a fiber orientation, for suppressing a peak of an initial load, providing an initiator that becomes a starting point for the destruction to occur has been proposed (see, for example, Japanese Patent Application Laid-open Publication No. H6-300068, Japanese Patent Application Laid-open Publication No. H6-341477, and Japanese Patent Application Laid-open Publication No. H7-217689). Whereas, in a composite structure of resin and fiber, to improve an out-of-plane strength (peel strength) including a shearing strength between layers and of a composition plane, a textile substrate for the composite material that uses needling has been proposed (see, for example, Japanese Patent Application Laid-open Publication No. 2003-39429).

DISCLOSURE OF INVENTION

Problem to be Solved by the Invention

However, in the energy absorbing member disclosed in Japanese Patent Application Laid-open Publication No. H6-300068, Japanese Patent Application Laid-open Publication No. H6-341477, and Japanese Patent Application Laid-open Publication No. H7-217689, there are proposals of raising energy absorption ability by an orientation of fibers by using on an inner side reinforced fibers of a strength higher than that on an outer side (Japanese Patent Application Laid-open Publication No. H6-300068), raising energy absorption ability by selecting material property (Japanese Patent Application Laid-open Publication No. H6-341477), and causing a sequential destruction assuredly and smoothly in a predetermined part by embedding a peel auxiliary layer that inhibits adhesion between the layers, but there is a problem that once the energy absorbing member has received an impact, the progress of the destruction depends fully on the material.

Moreover, in the textile substrate for the composite material disclosed in Japanese Patent Application Laid-open Publication No. 2003-39429, the strength between the layers and of the composition plane is improved and a contribution is made to improve a bending strength, however when it has received a compression such as it is received by the energy absorbing member, it is not the one that controls to absorb the impact while destroying a resin, and since this has a high strength as a medium even if it is used just as an energy absorbing member, it is not something that can absorb the impact effectively.

In view of the problems mentioned above, it is an object of the present invention to provide an impact-absorbing composite structure that can control the progress of the destruction while absorbing the impact by self destruction when the impact is applied, its manufacturing method, and a traveling body or a navigating body that uses it.

Means for Solving Problem

An impact-absorbing composite structure according to one aspect of the present invention is formed with a resin and a fiber laminated body, and absorbs, when experiencing an impact, the impact by self destruction. An interlayer-strength improvement technique is applied on the impact-absorbing composite structure in an oblique manner or in a gradual manner.

In the impact-absorbing composite structure according to the above aspect of the present invention, the interlayer-strength improvement technique is any one of a needling, a stitching, and a three-dimensional fabric.

In the impact-absorbing composite structure according to the above aspect of the present invention, a destruction due to an impact progresses when there is an initial load, and then the impact is sustained from a middle of delamination of the laminated body to prevent an impact absorbing ability of the impact-absorbing composite structure from being deteriorated.

A method according to another aspect of the present invention, which is for manufacturing an impact-absorbing composite structure that is formed with a fiber laminated body, and absorbs, when experiencing an impact, the impact by self destruction, includes impregnating a resin in the fiber laminated body; and applying an interlayer-strength improvement technique on the impact-absorbing composite structure.

A method according to still another aspect of the present invention, which is for manufacturing an impact-absorbing composite structure that is formed with a fiber laminated body, and absorbs, when experiencing an impact, the impact by self destruction, includes applying interlayer-strength improvement technique on the fiber laminated body; and impregnating a resin in the fiber laminated body.

A driving object according to still another aspect of the present invention includes the impact-absorbing composite structure according to the present invention.

An aviating object according to still another aspect of the present invention includes the impact-absorbing composite structure according to the present invention.

Effect of the Invention

According to an impact-absorbing composite structure according to the present invention, since an interlayer reinforcing area is provided by using a needling in the abovementioned impact-absorbing composite structure as an interlayer-strength improvement technique, it is possible to improve an amount of energy absorbed, and when an impact is applied, it is possible to perform a fixed-time control of a progress of destruction while absorbing the impact by self destruction.

EXPLANATIONS OF LETTERS OR NUMERALS

11 impact-absorbing composite structure
12 needling
13 interlayer reinforcing area

BEST MODE(S) FOR CARRYING OUT THE INVENTION

Exemplary embodiments of the present invention are explained in detail below with reference to the accompanying drawings. However, the present invention is not limited to these embodiments.

An impact-absorbing composite structure according to the present embodiment is an impact-absorbing composite structure formed by a resin and a fiber laminated body that absorbs an impact by self destruction when the impact is applied, and is a structure that is formed by providing an interlayer-strength improvement technique in an oblique manner or in a gradual manner, to the abovementioned impact-absorbing composite structure.

According to the present invention, in this interlayer structure, the interlayer-strength improvement technique is applied in an oblique manner or in a gradual manner, and the interlayer strength is improved by holding out the impact from a time during the destruction.

Here, a needling, a stitching, and a three-dimensional fabric can be named as interlayer-strength improvement techniques for example.

Moreover, in "to apply the interlayer-strength improvement technique in an oblique manner", the "oblique manner" means to cause to change a frequency of the interlayer-strength improvement technique together with a distance, and includes as well to cause to change continuously. Furthermore, in "to apply the interlayer-strength improvement technique in a gradual manner", the "gradual manner" means to cause to change the frequency of the interlayer-strength improvement technique for each fixed distance, and includes as well a case of causing to change in a gradual manner and a case of causing to change discontinuously. Further, concretely, by referring to FIGS. 5A to 5H an example of a pattern of its application is described later.

Further, it is better not to apply the interlayer-strength improvement technique from an initiator portion and an end portion of the impact-absorbing composite structure due to a need to absorb the impact at an initial start of the self destruction, up to a predetermined position.

Figure 1:
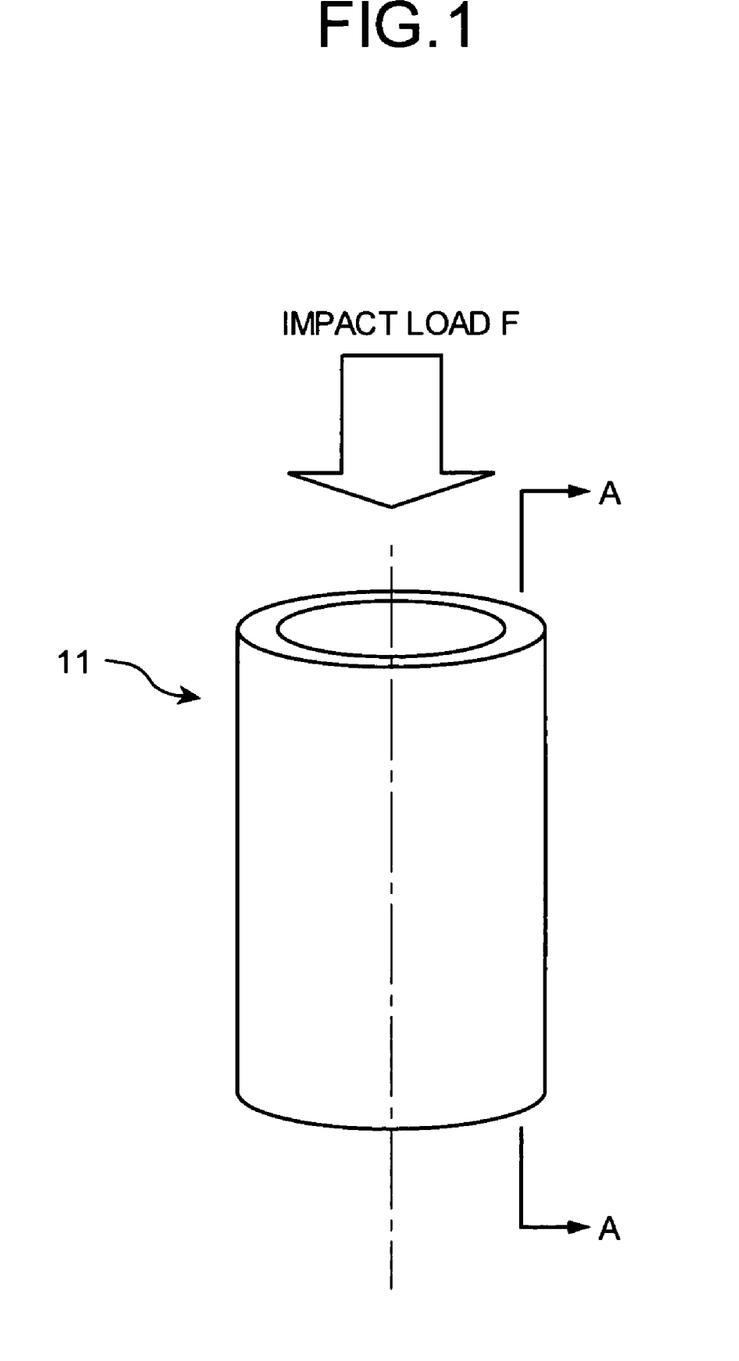
FIG. 1 is a perspective view of an impact-absorbing composite structure according to the present embodiment.
Figure 2A:
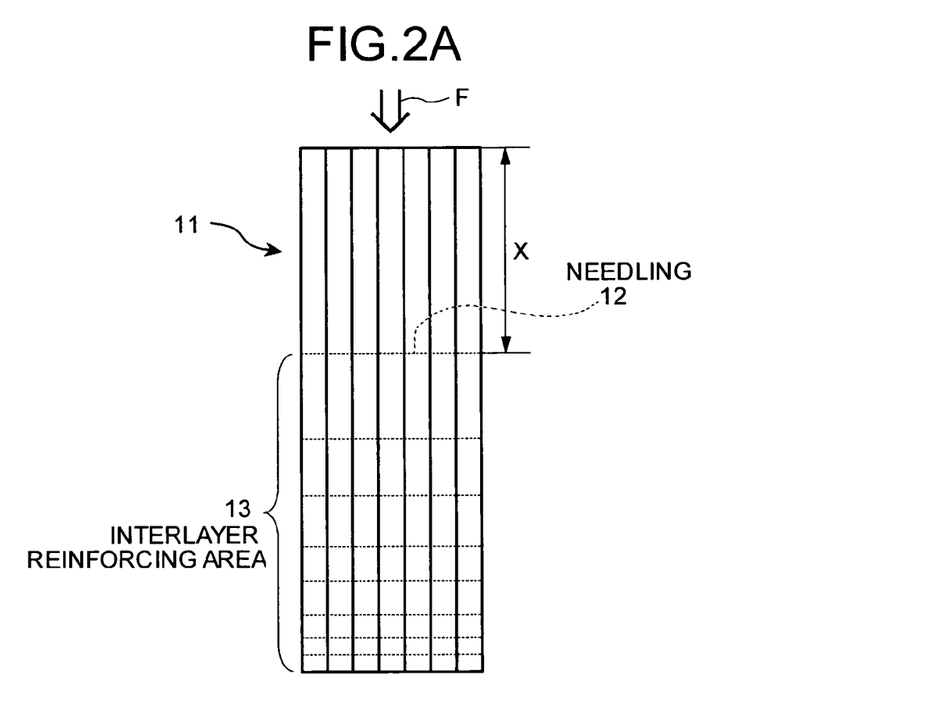
FIGS. 2A and 2B are A-A cross sections of FIG. 1.
Figure 2B:
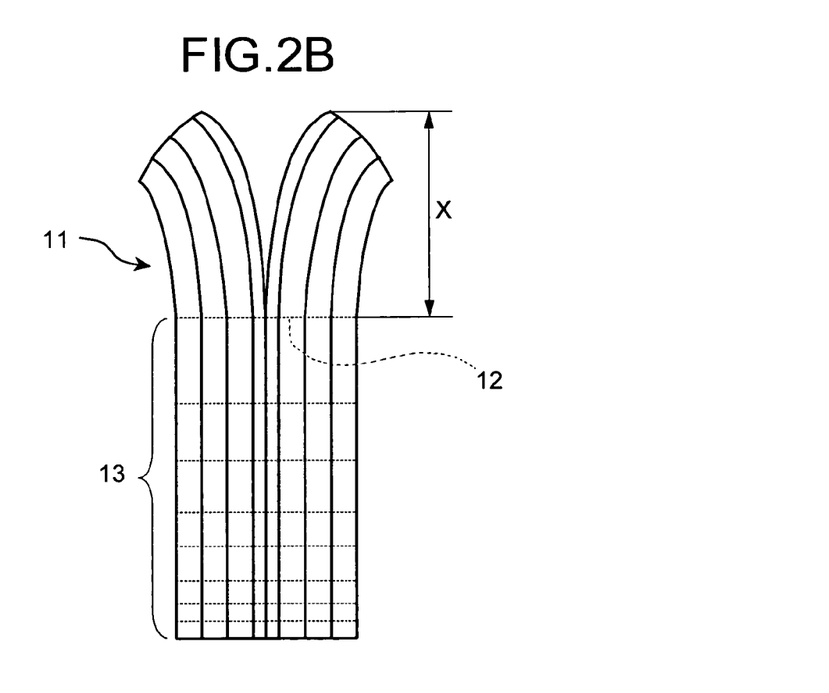
Figure 3:
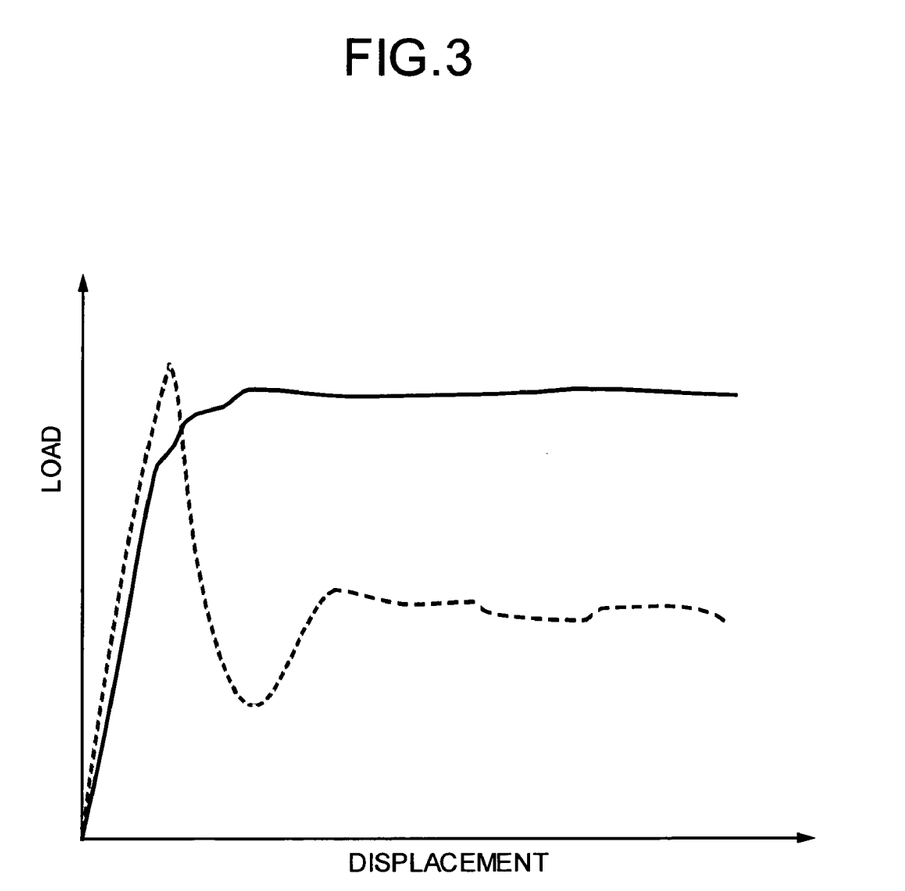
FIG. 3 is a diagram of a relation between an impact load and a displacement according to the impact-absorbing composite structure.

A formation of the impact-absorbing composite structure in which the interlayer-strength improvement technique is applied is described below with reference to FIG. 1 and FIGS. 2A and 2B. FIG. 3 is a diagram of a relation between an impact load and a displacement. As shown in FIG. 1, as an example, a cylindrical shaped impact-absorbing composite structure 11 is used. FIGS. 2A and 2B are A-A cross sections of FIG. 1, and as the interlayer-strength improvement technique, an interlayer reinforcing area 13 is provided by using a needling 12 to the abovementioned impact-absorbing composite structure, and the strength is reinforced so that the progress of a destruction is not advanced at once.

Here, according to the present embodiment, although the interlayer reinforcing area 13 is formed by the needling 12 such that the distance is reduced gradually from an upper end towards a lower end in the diagram, that is a load axial of an impact load F, the present invention is not restricted to this and the needling may be applied with a fixed distance, and furthermore by widening and shortening the distance appropriately, the target impact absorbing efficiency is improved.

According to the present invention, to absorb the impact effectively at the initial start of the self destruction, the interlayer-strength improvement technique is not applied from the end portion of the impact-absorbing composite structure 11 up to a predetermined position X.

Further, as shown in FIG. 3, in a case where the interlayer reinforcing area 13 is provided as according to the present embodiment, as shown by a solid line, even after an initial load is exerted, it is possible to hold the impact load during the fixed period of time, and the destruction is progressed at a fixed load. As a result, an amount of energy absorbed increases. Whereas, in a case where the interlayer reinforcing area such as the needling is not provided, as shown by a dashed line, a large load is exerted at a time of start of destruction, the destruction progressed at once, the energy absorption suddenly became small, and the impact could not be maintained from during the destruction.

As a result, when the interlayer reinforcing area is provided, the amount of energy absorbed became 90 kJ/kg and as compared to the amount of energy absorbed 60 kJ/kg when the interlayer reinforcing area is not provided, the amount of energy absorbed increased by 50%.

Further, since an amount of specific energy absorbed is 30 kJ/kg for steel, 30 to 70 kJ/kg for aluminum, 60 to 70 kJ/kg for carbon fiber reinforced plastic (Trends on Vehicular Material Constitutions & Impact Characteristics of Selected Pieces by Hiroyuki Mitsuishi (Japan Automobile Research Institute) Japan Automobile Research, Vol. 18/No. 9 (September 1996)), the impact-absorbing composite structure according to the present invention has the amount of energy absorbed that is greater than or equal to that of these impact absorbing materials.

Therefore even in an area where restrictions of area and stroke are strict and where an impact resistant member is disposed in a helicopter etc., it can be used as a good impact resistant member.

Figure 4:
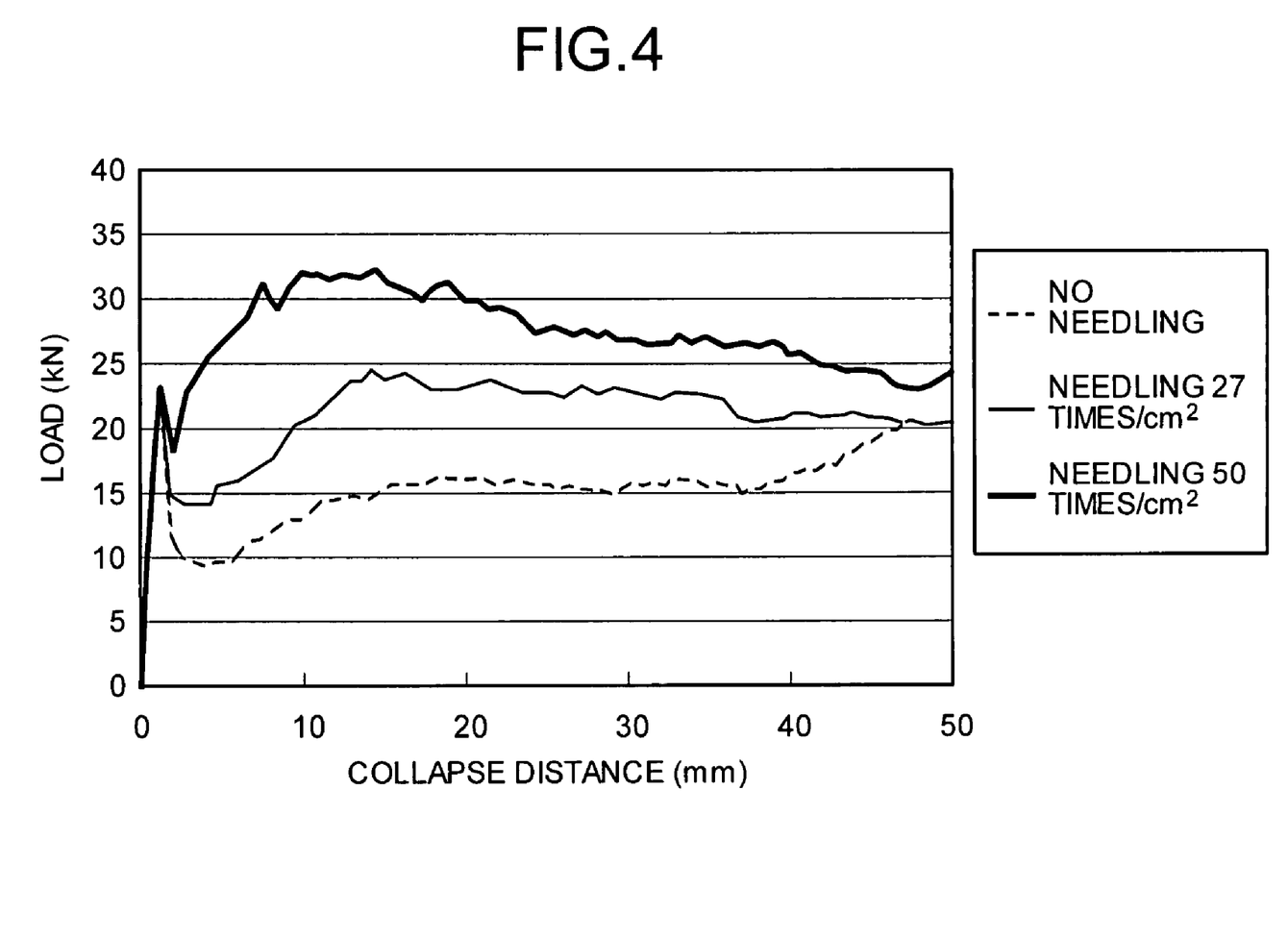
FIG. 4 is a diagram of a relation between a load and a collapse distance according to the impact-absorbing composite structure.

FIG. 4 is a result when a frequency is changed with the needling applied and compared with a case where needling is not applied. A fiber orientation (+45/0/–45/0/0/–45/0/+45) laminated body prepreg was used as a test specimen and a static compression test was performed. A specimen that has a cylindrical shape similar to that in FIG. 1, a diameter 50 mm, and a height 75 mm was used. The needling was performed with a constant pitch from a position 5 mm from an upper end of a cylinder up to a lower end. The needling was performed with frequencies 0 times/cm2, 27 times/cm2, and 50 times/cm2. The result is shown in FIG. 4.

As shown in FIG. 4, an improvement in a load (kN) retention due to an increase in the needling frequency was seen, and it was confirmed that the impact resistance can be maintained for a fixed period of time.

Applying the interlayer-strength improvement technique according to the present embodiment on the priority basis or in a gradual manner may be changed appropriately according to an object, and it is not restricted in particular, and an example of an application pattern of the interlayer-strength improvement technique is shown in FIGS. 5A to 5H. Further, in FIGS. 5A to 5H a vertical axis is a needling density (times/cm$^2$), and a horizontal axis is a load axial (L).

Figure 5A:
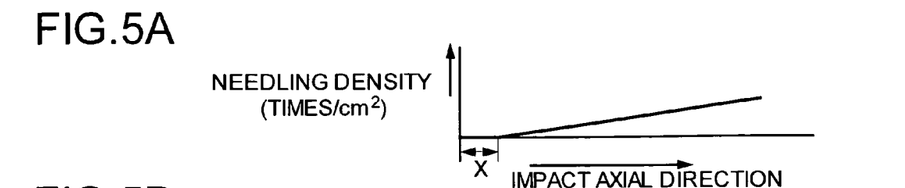
FIGS. 5A to 5H are diagrams that indicate an example of a pattern of a method for improving an interlayer strength.
Figure 5B:
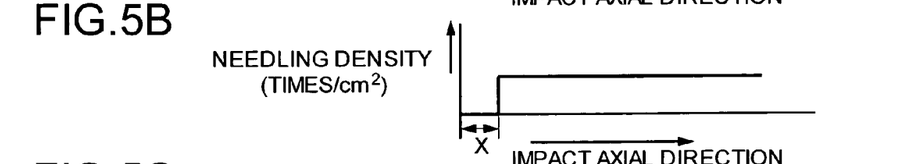
Figure 5C:
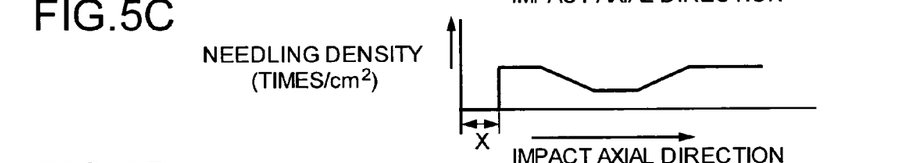
Figure 5D:
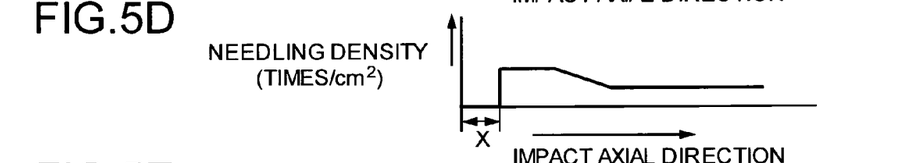
Figure 5E:
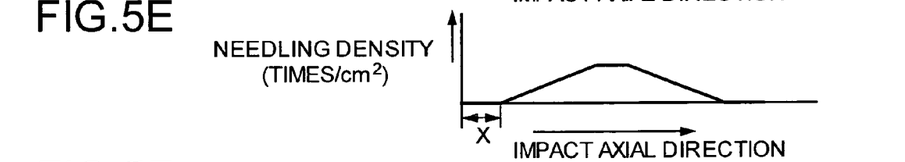
Figure 5F:
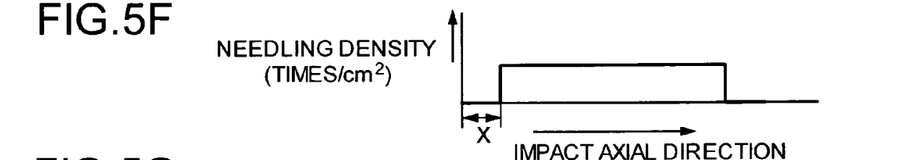
Figure 5G:
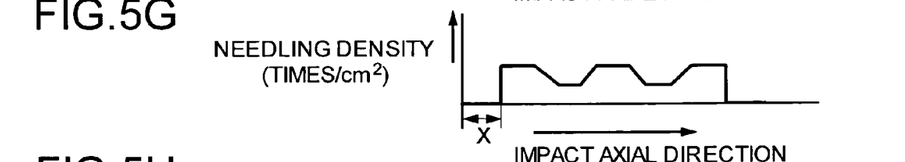
Figure 5H:
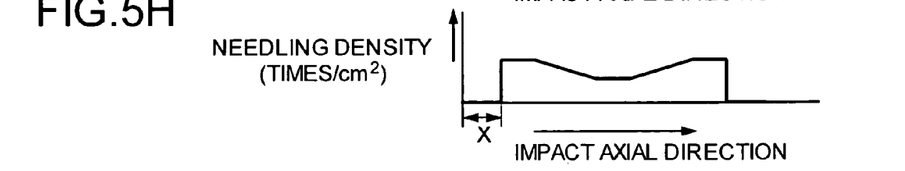

FIG. 5A is a diagram in which the needling is not applied up to the predetermined position X, and then as shown in FIGS. 2A and 2B a distance of the needling is changed gradually from wide to close (the needling pitched is shortened gradually). FIG. 5B is a diagram in which the needling is not applied up to the predetermined position X, and then the needling is applied with a constant distance. FIG. 5C is a diagram in which the needling is not applied up to the predetermined position X, and then the needling is applied after the needling distance is let to be close, from midway changed to wide, and then again close. FIG. 5D is a diagram in which the needling is not applied up to the predetermined position X, and then the needling is applied after the needling distance is let to be close, from midway changed to wide, and then kept constant. FIG. 5E is a diagram in which the needling is not applied up to the predetermined position X, and then the needling distance is let to be close from wide, and then let to be wide from close. Further, the needling is not applied on an end portion and a destruction-start portion is provided. FIG. 5F is a diagram in which the needling is not applied up to the predetermined position X, and then the needling distance is let to be close with a constant distance. Further, the needling is not applied on the end portion and the destruction-start portion is provided. FIG. 5G is a diagram in which the needling is not applied up to the predetermined position X, and then the needling distance is repeatedly changed from wide to close alternately, and in the end let to be close. Further, the needling is not applied on the end portion and the destruction-start portion is provided. FIG. 5H is a diagram in which the needling is not applied up to the predetermined position X, and then gradually the needling distance is changed from close to wide, and then again gradually changed to close. Further, the needling is not applied on the end portion and the destruction-start portion is provided.

The pattern in which a needling reinforced area is formed in an oblique manner or in a gradual manner is not restricted to the one described above.

Although the needling distance of the abovementioned pattern is regulated, apart from this the frequency of needling may be changed according to a location.

Figure 6:
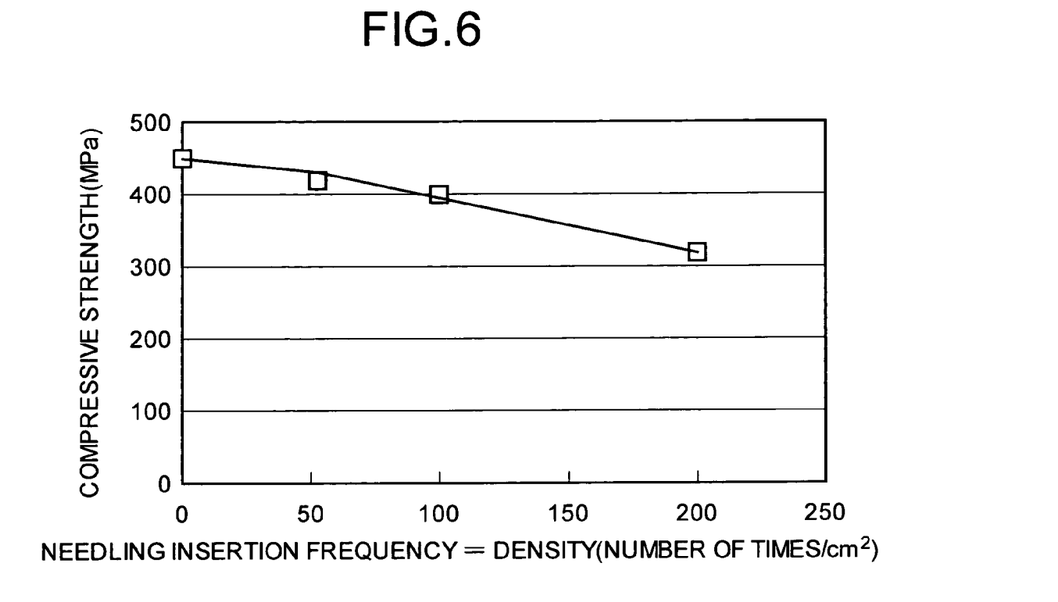
FIG. 6 is a diagram indicating a relation between a needling insertion frequency and a compressive strength.

FIG. 6 is a diagram of a relation between a needling insertion frequency and a compressive strength. As it is evident from FIG. 6, when the needling frequency is increased to greater than or equal to 75 times/cm2, since a drop in the compressive strength was observed, if the needling is performed beyond the required frequency, there is a decline in the strength.

Here, a fiber material of the fiber laminated body that forms the impact-absorbing composite structure is not restricted to any particular material, and a carbon fiber, a glass fiber, a ceramic fiber, an aramid fiber (KEVLAR (registered trademark) etc.), an aromatic polyamide fiber, alumina fiber, and a silicon carbide fiber or a boron fiber are examples.

Moreover, a resin material that forms the impact-absorbing composite structure is not restricted to any particular material, and thermosetting resins such as an epoxy resin, an unsaturated polyester resin, a phenol resin, an epoxy acrylate (vinylester) resin, a bismaleimide resin, a polyimide resin, a guanamine resin, a furan resin, a polyurethane resin, a polydiarylphthalate resin, and an amino resin are examples. Moreover, for example, polyamides such as nylon 6, nylon 66, nylon 11, nylon 610, and nylon 612, and their copolyamides, polyesters such as polyethylene terephthalate and polybutylene terephthalate, or their copolyesters, moreover, thermoplastic elastomers typified by polyester elastomers and polyamide elastomers, and furthermore polycarbonates, polyamide imides, polyphenylenesulfides, polyphenyleneoxides, polysulfones, polyethersulfones, polyetherether ketones, polyetherimides, and polyolefins are the examples. Furthermore, rubbers such as acrylic rubber, acrylonitrile butadiene rubber, urethane rubber, silicone rubber, styrene butadiene rubber, and fluoro rubber can be used as a resin that satisfy the range described above, and moreover, combined resins that are constituted by combining a plurality of resins selected from the rubbers, the thermoplastic resins, and the thermosetting resins mentioned above may as well be used.

Moreover, the impact-absorbing composite structure is not restricted to the cylindrical shaped as shown in FIG. 1, and apart from a cylinder with its apex having a conical shape or spherical shaped, an angular cylinder, a cone, an pyramid, a truncated cone, a truncated pyramid, or a cylinder having an oval shaped transverse section, furthermore a cylindrical shape such as a cylinder (or an angular cylinder) provided with a flange portion may be used. Moreover, apart from the cylindrical shape, it may be let to be a pilaster shaped such as a circular cylinder and an angular cylinder. Moreover, it may be formed by one member but not restricted to this and may be formed by piling up or combining a plurality of members.

Moreover, an initiator that becomes a starting point for the destruction to occur may be provided on one end or both ends of an impact load axial of the impact-absorbing composite structure.

Figure 7:
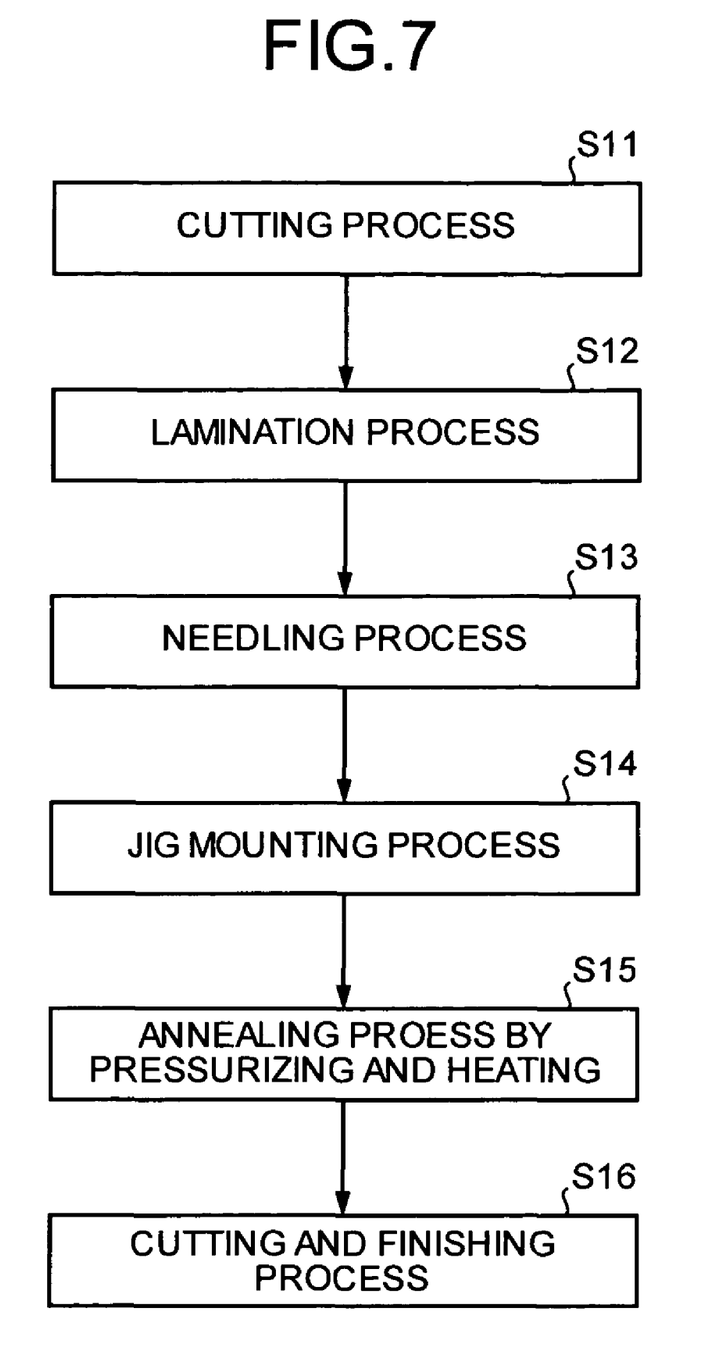
FIG. 7 is a manufacturing-process diagram of the impact-absorbing composite structure.

A manufacturing example of the impact-absorbing composite structure according to the present embodiment is described below. FIG. 7 shows an example, in which the prepreg is manufactured, then the needling is applied, and pressure is applied by autoclave. As shown in FIG. 7, a manufacturing method of the impact-absorbing composite structure includes a cutting process (S11) of cutting the prepreg that includes a resin and a fiber laminated body to a predetermined length, then a lamination process (S12) of laminating these, a needling process (S13) of applying needling as the interlayer strength improvement technique on the laminated body, a jig mounting process (S14) of mounting the laminated body on which the needling is applied on a jig, a hardening process by pressurizing and heating (S15) of hardening by heating while pressurizing after mounting on the jig, and a cutting and processing process of removing from the jig, cutting, and processing. This enables to obtain the impact-absorbing composite structure with the improved impact resistance.

Figure 8:
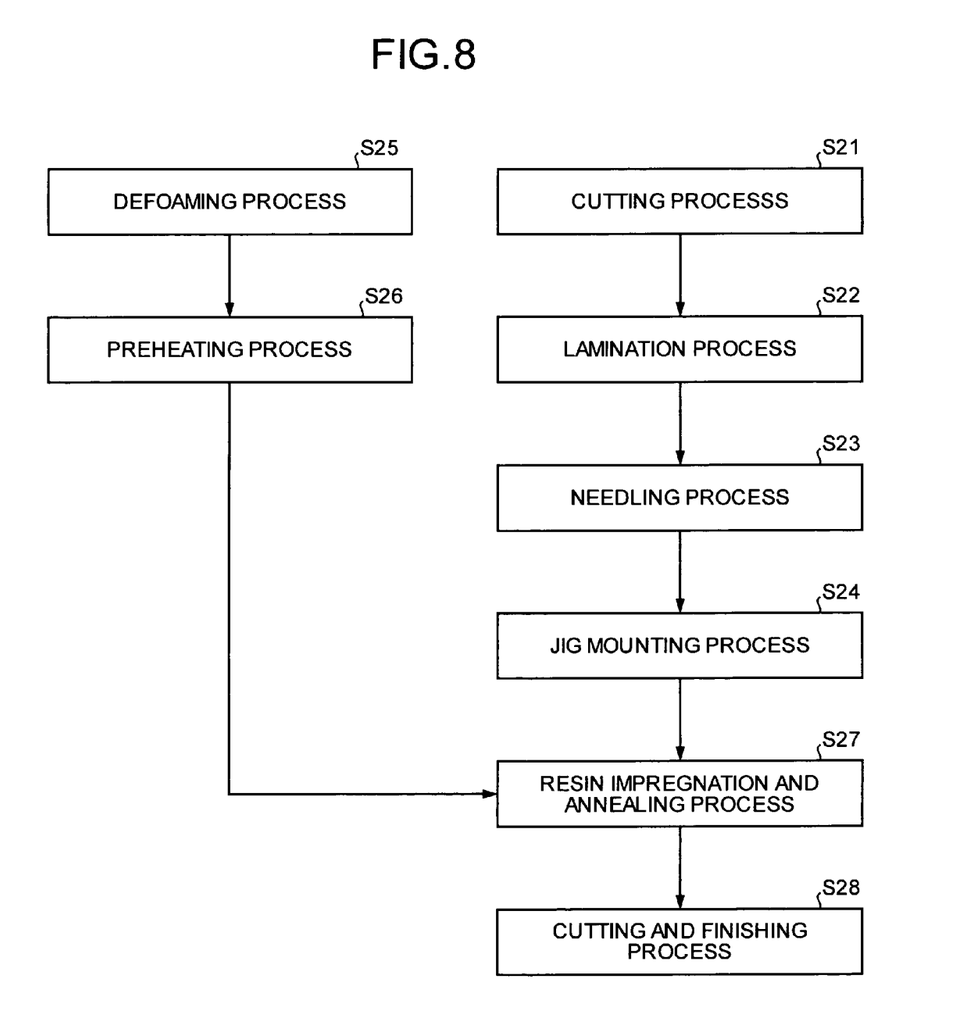
FIG. 8 is another manufacturing-process diagram of the impact-absorbing composite structure.

FIG. 8 is an example in which it is formed by a vacuum resin impregnation forming method. As shown in FIG. 8, the manufacturing method of the impact resisting composite structure includes the cutting process (S21) of cutting the fiber laminated body to a predetermined length, the lamination process (S22) of laminating these, the needling process (S23) of applying needling as the interlayer strength improvement technique on the laminated body, the jig mounting process (S24) of mounting the laminated body on which the needling is applied on the jig, a defoaming process (S25) of defoaming with the resin, a preheating process (S26) of preheating the resin that is defoamed, a hardening process by resin impregnation and heating of supplying the resin that is preheated in the preheating process (S26), impregnating it, and heat hardening, and the cutting and processing process (S28) of removing from the jig, cutting, and processing. This enables to obtain the impact-absorbing composite structure with the improved impact resistance.

Figure 9:
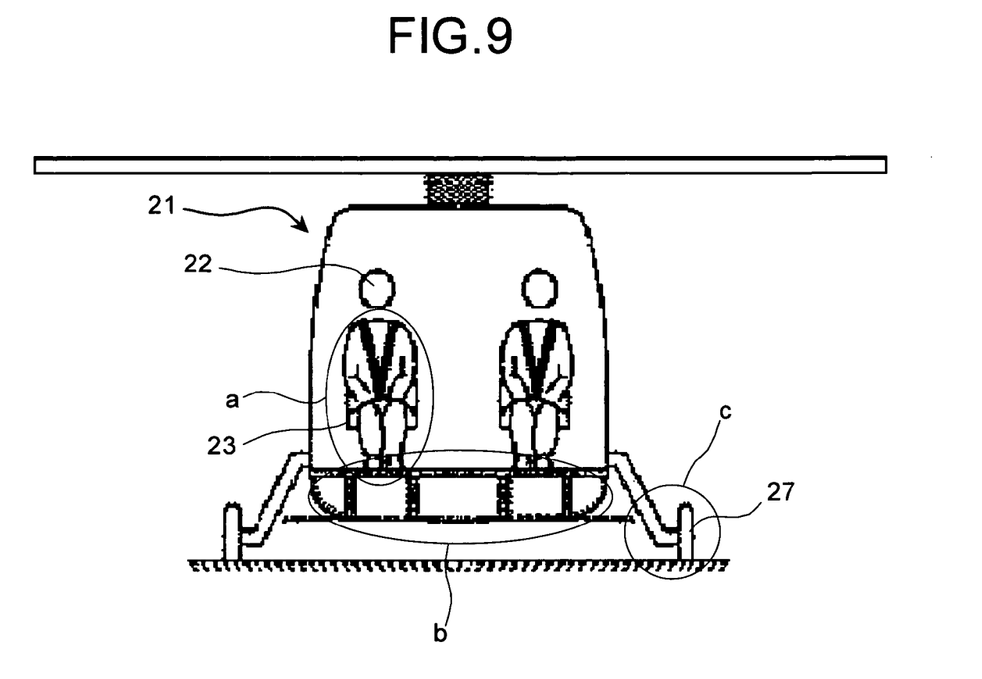
FIG. 9 is a schematic diagram of a helicopter in which the impact-absorbing composite structure is used.
Figure 10A:
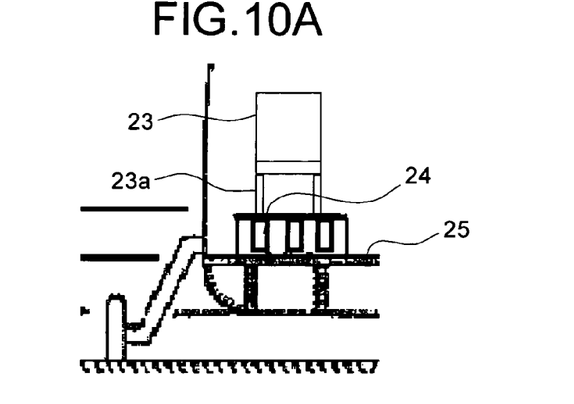
FIGS. 10A to 10D are enlarged views of main parts of FIG. 9.

Application examples of the impact-absorbing composite structure according to the present invention are shown in FIG. 9 and FIGS. 10A to 10D. FIG. 9 is a schematic diagram of a helicopter and shows a passenger 22 sitting on a seat 23 in a helicopter 21. FIG. 10A is an enlarged portion of a portion a in FIG. 9, in which the impact-absorbing composite structure is used in a mounting platform 24 of the seat 23 of the passenger 22. In this application example, the mounting member that includes the impact-absorbing composite structure 11 between a floor face 25 and a seat leg 23a.

Figure 10B:
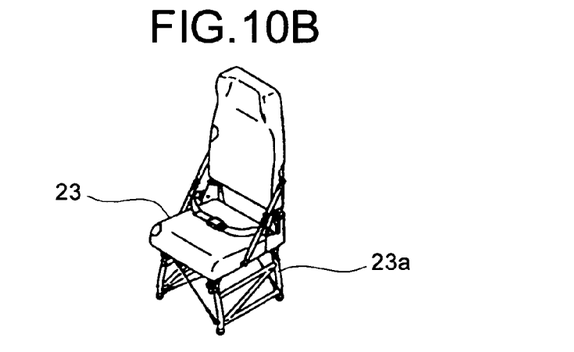

FIG. 10B is an enlarged perspective view of the portion a in FIG. 9, in which the impact-absorbing composite structure is used as the impact resistant member in the seat leg 23a of the passenger 22.

Figure 10C:
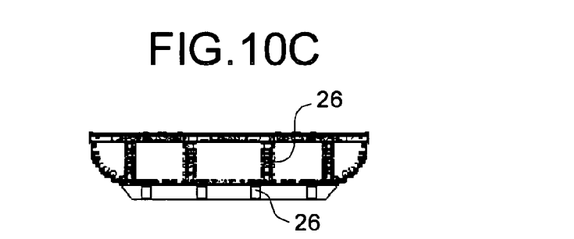

FIG. 10C is an enlarged portion of a portion b in FIG. 9, in which the impact-absorbing composite structure is used as the impact resistant member in an impact resisting structure portion 26 that is projected from an under floor of the helicopter 21.

Figure 10D:
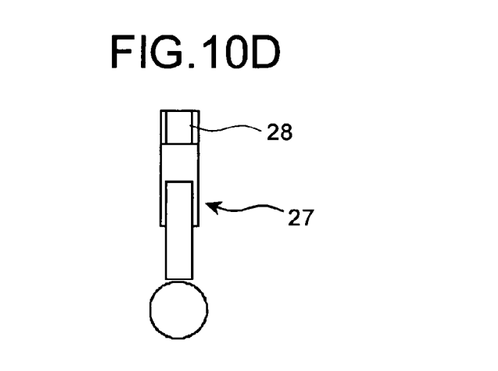

FIG. 10D is an enlarged portion of a portion c in FIG. 9, in which the impact-absorbing composite structure is used as the impact resistant member in a shock strut interior 28 of a wheel landing gear 27.

Thus as described above, the impact-absorbing composite structure according to the present invention can be used around a seat and for each structural member of a flight vehicle as the energy absorbing member that absorbs the impact energy efficiently. Moreover, it can be used not only in the flight vehicle but also around a seat and a bumper of a vehicle as the impact resistant member.

INDUSTRIAL APPLICABILITY

Thus, the impact-absorbing composite structure according to the present invention can be used as an energy absorbing member that absorbs an impact energy efficiently, and in particular it is appropriate for use as an impact absorbing member around a seat and for each structural member of a flight vehicle such as a helicopter, and around a seat and a bumper of a vehicle such as a car.

The invention claimed is:

1. An impact-absorbing composite structure that is formed with a resin and a fiber laminated body, the impact-absorbing composite structure absorbing an impact by self destruction when experiencing an impact, wherein an interlayer-strength improvement technique is applied on the impact-absorbing composite structure in an oblique manner or in a gradual manner with respect to an impact orientation.

2. The impact-absorbing composite structure according to claim 1, wherein the interlayer-strength improvement technique is any one of a needling, a stitching, and a three-dimensional fabric.

3. The impact-absorbing composite structure according to claim 1, wherein the interlayer-strength improvement technique is applied to a portion which is a predetermined distance from an end portion of the impact-absorbing composite structure, so a destruction due to an impact progresses when there is an initial load, and then the impact is sustained from a middle of delamination of the laminated body to prevent an impact absorbing ability of the impact-absorbing composite structure from being deteriorated.

* * * * *